United States Patent [19]

Wolfe et al.

[11] 4,423,206

[45] Dec. 27, 1983

[54] VICINAL ALKYLENE OXIDE POLYMERIZATION

[75] Inventors: David L. Wolfe, Midland, Mich.; Frederick P. Corson, Miami, Fla.

[73] Assignee: The Dow Chemical Co., Midland, Mich.

[21] Appl. No.: 390,017

[22] Filed: Jun. 21, 1982

Related U.S. Application Data

[62] Division of Ser. No. 274,135, Jun. 16, 1981, Pat. No. 4,376,723.

[51] Int. Cl.³ ............................................. C08G 65/12
[52] U.S. Cl. .................................. 528/416; 526/189; 528/361; 528/393
[58] Field of Search ............... 528/416, 361, 393, 413; 526/189

[56] References Cited

U.S. PATENT DOCUMENTS

| | | | |
|---|---|---|---|
| 3,422,034 | 1/1969 | Calderon | 528/393 |
| 3,422,040 | 1/1969 | Tomomatsu | 528/416 X |
| 3,480,567 | 11/1969 | Matsui et al. | 528/416 X |
| 3,484,388 | 12/1969 | Wofford | 528/416 X |
| 3,499,847 | 3/1970 | Mange et al. | 528/414 X |
| 3,506,597 | 4/1970 | Asai et al. | 528/416 |
| 3,532,645 | 10/1970 | Schulze et al. | 528/413 |
| 3,654,183 | 4/1972 | Klein et al. | 528/413 X |
| 3,712,870 | 1/1973 | Guillot | 528/413 |

*Primary Examiner*—Earl A. Nielsen
*Attorney, Agent, or Firm*—Douglas N. Deline; David H. Fifield

[57] ABSTRACT

A polymerization process for vicinal alkylene oxides and a catalyst for said polymerization process where the catalyst comprises a composition prepared by contacting an alkyl aluminum compound with an organic nitrogen base compound selected from secondary nitrogen-containing compounds having basicity less than or about equal to the basicity of dimethylamine, with a β-diketone and with water where the components are combined in prescribed molar ratios. The molecular weight of the resultant polymers produced in a process utilizing such a catalyst may be controlled by adjusting the ratio of the secondary amine component and very high molecular weight polymers may be obtained, as determined by their intrinsic viscosities. The very high molecular weight polymeric products are useful as elastomers and as thickeners for various aqueous or organic solutions.

8 Claims, 2 Drawing Figures

Final Intrinsic Viscosity vs. H₂O Conc. in Catalyst for Polymer of 95/5 PO/AGE in EtBZ, 50° C

VICINAL ALKYLENE OXIDE POLYMERIZATION

CROSS-REFERENCE TO RELATED APPLICATION

This is a divisional of application Ser. No. 274,135, filed June 16, 1981, now U.S. Pat. No. 4,376,723, issued Mar. 15, 1983.

BACKGROUND OF THE INVENTION

The invention relates to a process and a catalyst for polymerization of vicinal alkylene oxides to very high molecular weights in a fashion by which the molecular weight of the polymers can be easily controlled by adjusting the amount of one of the components of the catalyst in a specified fashion.

Previously, polyethers of high molecular weight have been made by contacting with catalysts prepared from various organometallic compounds, specifically zinc and aluminum alkyls, aluminum hydrides, or ferric chloride complexes.

U.S. Pat. No. 2,706,181 shows the preparation and utilization of a catalyst for polymerization of olefin oxides which catalyst is the condensation product of a ferric halide and propylene oxide. U.S. Pat. No. 2,870,100 illustrates the utilization of organoaluminum, organozinc or organomagnesium compounds as catalysts for alkylene oxide polymerization. U.S. Pat. No. 2,801,228 teaches the use of aluminum, nickel, cobalt and copper-acetyl acetone compounds as "hardening agents" for polyepoxide resins. U.S. Pat. No. 3,219,591 describes the utility of alkyl aluminums modified with water and optionally a $\beta$-diketone as polymerization catalysts for alkylene oxides. U.S. Pat. No. 3,186,958 shows alkyl aluminums in combination with secondary amines and optionally water as alkylene oxide polymerization catalysts. U.S. Pat. No. 3,301,796 describes alkyl aluminum or alkyl zinc compounds in combination with an active hydrogen co-catalyst which may be water, an alkanol, a primary or secondary amine, or an amide in combination with nitroaromatic hydrocarbons as alkylene oxide polymerization catalysts and U.S. Pat. No. 3,499,847 and 3,617,571 also describe alkyl aluminums plus a nitroaromatic compound optionally with a $\beta$-diketone and water. In U.S. Pat. No. 3,532,644, the catalysts of the 3,617,571 patent are employed and, after polymerization is completed and the catalyst is deactivated, antioxidants including phenothiazine are added to the polymer.

So far as the Applicants know, only U.S. Pat. No. 3,394,088 shows the combination of a secondary amine with an aluminum compound and additionally the optional components of water and a $\beta$-diketone. However, this patent teaches that the catalyst is an inorganic-type catalyst which does not contain any direct aluminum to carbon bond. Comparison of such catalysts with those catalysts instantly claimed shows the catalyst of the present invention to be more effective for the production of high molecular weight vicinal alkylene oxide polymers.

SUMMARY OF THE INVENTION

The invention includes a catalyst for the polymerization of vicinal alkylene oxide to high molecular weight polymers said catalyst comprising a composition prepared by contacting:

Component A, a compound represented by the formula RR'AlX wherein R and R' each independently represent an alkyl group of 1 to 4 carbon atoms, and X represents hydrogen or an alkyl or alkoxy group of 1 to 4 carbon atoms;

Component B, an organic nitrogen base compound selected from secondary nitrogen-containing compounds having basicity about equal to or less than the basicity of dimethylamine and having no active hydrogen atoms other than those of the secondary nitrogen;

Component C, a $\beta$-diketone; and

Component D, water;

in the molar ratios of

B:A—about 0.01–2.5:1

C:A—about 0.1–1.5:1

D:A—about 0.1–1.5:1 provided that when the molar ratio of (C+2D):A is greater than about 3:1, then the B:A molar ratio is at least about 1:1.

The invention also comprises a process for the polymerization of a vicinal alkylene oxide represented by the formula

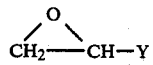

where Y represents $R_1$ or $CH_2OR_2$; $R_1$ represents H, an aliphatic hydrocarbyl group of about 1 to 20 carbon atoms, a chloromethyl or a bromomethyl group; and $R_2$ represents the acyl residue of a carboxylic or fatty acid of about 1 to 30 carbon atoms or a hydrocarbyl group of about 1 to 20 carbon atoms which may bear other vicinal alkylene oxide groups or inert substituents; said process comprising contacting said vicinal alkylene oxide with a catalytically effective amount of the aforementioned catalyst.

By varying the secondary amine content from about 0.01 up to about 2.5 moles per mole of aluminum present in the catalyst, a wide variety of polyether products may be prepared using the aforementioned process. These products range from very high molecular weight polyethers, having very high intrinsic viscosities when the invention catalyst is derived from the preferred secondary amines in a B:A molar ratio of about 0.1 to about 0.5:1, to high molecular weight polyethers having intrinsic viscosities similar to those attainable with recognized catalysts when the invention catalyst employed for polymerization is derived from a more basic secondary amine or where the B:A molar ratio is about 1.5 to about 2.5:1. The polyethers prepared by the invention process have the ability to thicken aqueous or organic solutions in which they are soluble, their ability to thicken being proportional to their intrinsic viscosities. Consequently, an equivalent thickening of a given solution may be obtained by addition of a lesser quantity of the very high intrinsic viscosity polyethers than would be needed when using polyethers of lower intrinsic viscosity. Hence, an advantage can be obtained when a polyether of higher intrinsic viscosity is produced.

Additionally, the very high molecular weight polyethers produced in the invention process exhibit non-Newtonian flow properties as evidenced by the fact that a solution of such polyethers thickens when a shearing force is applied to the solution. For example, one specific utility is as an antimisting agent for a jet fuel composition such as is described in U.S. Pat. No. 3,996,023 or as an antimisting agent for a cutting oil such as is commonly employed with high speed cutting instruments for the purpose of reducing friction and heat. These shear-thickening polyethers may be added to a fire fighting solution, such as is applied to timber in the path of a forest fire, to thicken the solution and maintain the solution in intimate contact with the flammable surface to be protected and thereby counteract the detrimental effect that the force of gravity exerts in removing such solutions from the surface to be protected. Some of the polyethers are also useful as synthetic rubbers and may be employed to modify and improve the impact properties of plastics, such as polystyrene.

DETAILED DESCRIPTION OF THE INVENTION

Catalyst

Figure 1:
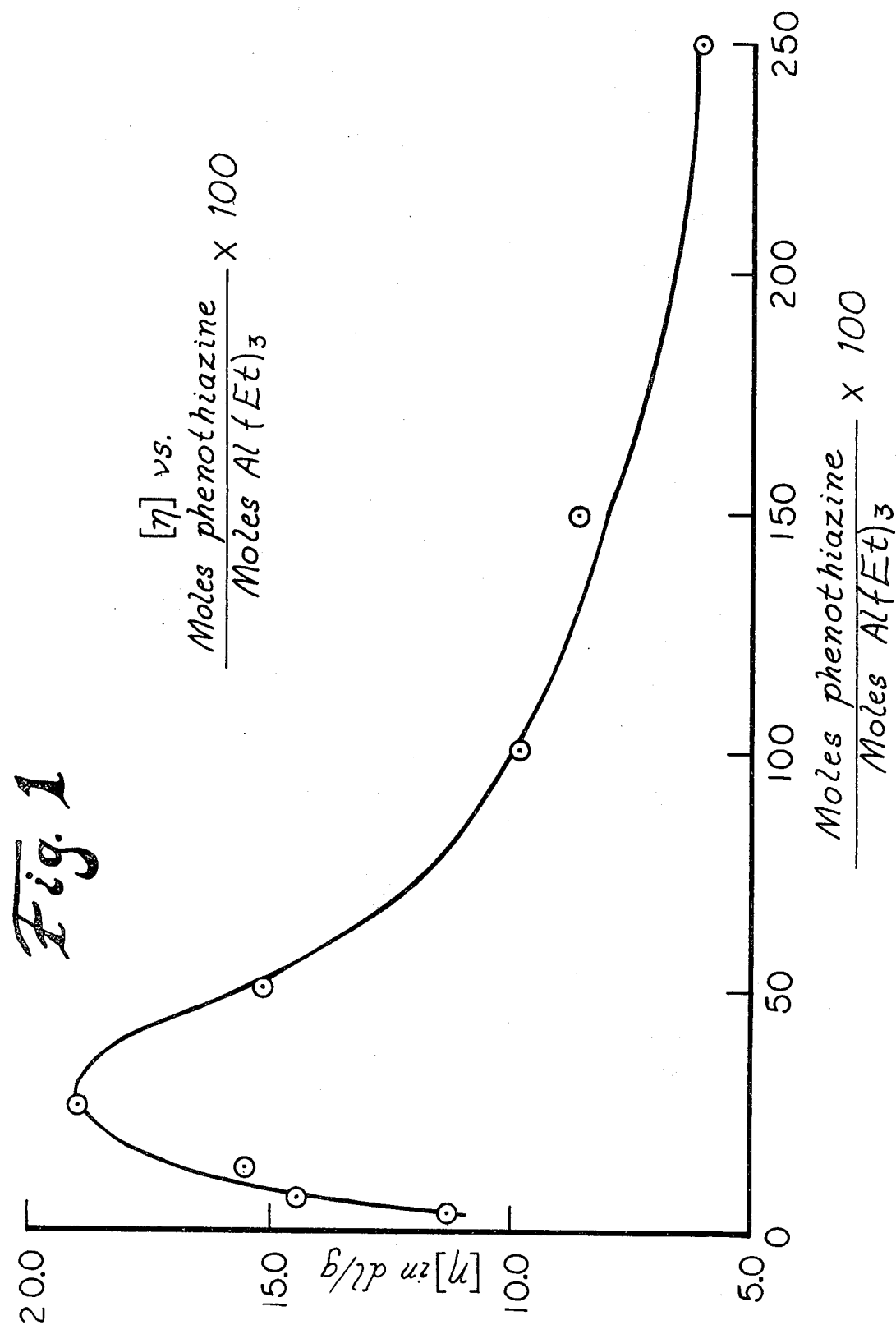

Component A of the catalyst is a compound represented by the formula RR'AlX wherein R and R' each independently represent an alkyl group of 1 to about 4 carbon atoms, and X represents hydrogen or an alkyl or alkoxy group of 1 to about 4 carbon atoms. In a preferred mode, X represents an alkyl group. In a more preferred mode, R, R' and X all represent the same alkyl group and most preferably, the compound is triethylaluminum. Examples of suitable compounds are trimethylaluminum, triethylaluminum, triisobutylaluminum, tri-n-propylaluminum, tri-n-butylaluminum, diethylaluminum hydride, dipropylaluminum hydride, diisobutyl aluminum hydride, diethyl ethoxy aluminum, and diisobutyl ethoxy aluminum.

Component B is an organic nitrogen base compound selected from secondary nitrogen-containing compounds having basicity about equal to or less than the basicity of dimethylamine and having no active hydrogen atoms other than those of the secondary nitrogen. By "active hydrogen atoms" are meant Zerewitinoff hydrogen atoms (see J. Am. Chem. Soc., 49:3181 (1928)) which initiate alkylene oxide polymerization as are found on hydroxyl, thio or primary and secondary amine functional groups. Such secondary amines are commonly those bearing electron-withdrawing groups in close proximity to the nitrogen atom such as carbonyl groups, phenyl rings, cyano groups, halo groups, carboxylic acids or ester groups, and other such groups that have strong electron-withdrawing effects on the secondary amine. For example, such compounds are N-alkyl or -aryl amides, arylalkylamines, diarylamines, and other weak bases. Secondary amines having a $pK_b$ of greater than about 4 are suitable and those having $pK_b$ of greater than about 6 are preferred. Examples of suitable secondary amines are dimethylamine, diethylamine, N-methylaniline, N-methyl-p-nitroaniline, N-alkylacetamide, N-arylacetamide, succinimide, diphenylamine, phenothiazines, phenoxazines. Especially preferred are phenoxazine, phenothiazine and N-acetamide.

The strengths of organic bases are complied for a large number of such bases in the IUPAC work by D. D. Perrin, "Dissociation Constants of Organic Bases in Aqueous Solutions", Butterworths (London, 1965). For most secondary organic amines not listed therein, relative base strength may be deducted by examining the value noted for a structurally related amine then estimating the effect of structural differences on the base strength. For example, conjugation of the amino group with electron withdrawing groups lowers the base strength of the amino group. The effects of structural changes in organic amines are discussed in great detail in numerous works, for example in "The Chemistry of the Amino Group", S. Patai, Ed., Chapter 4, "Basicity and Complex Formation" by J. W. Smith, pp. 161–204, Interscience (New York, 1968).

One simple method for determining whether a secondary amine is less basic than dimethylamine is to employ both in side-by-side preparation of the catalyst, use the resulting catalyst in polymerization of a monomer such as propylene oxide, and then determine the intrinsic viscosities of the resulting polypropylene oxide products. If the intrinsic viscosity of the product derived from the catalyst prepared with dimethylamine is lower than the one from the other amine, then the other amine may be considered less basic than dimethylamine.

The amount of Component B to be employed may be expressed in the molar ratio of Component B per mole of Component A. The lower amount is suitably about 0.01, preferably about 0.05 and most preferably about 0.1. The upper amount is suitably about 2.5, preferably about 1 and most preferably about 0.5. The optimum molar ratio of B:A for producing very high molecular weight polyethers is about 0.25:1.

Component C is selected from β-diketones or the tautomeric enol form thereof. Suitable, for example, are 2,4-pentanedione, 2,4-hexanedione, 3,5-heptanedione, 1-phenyl-1,3-butanedione, ethylacetylacetate, and similar materials. Examples of numerous suitable β-diketones are described in U.S. Pat. No. 2,866,761. Preferred for use as Component C is 2,4-pentanedione because of its relatively ready availability.

For the amount of Component C to be employed, expressed as moles of C per mole of A, a lower amount is suitably 0.1 and preferably 0.2. As an upper amount the ratio is suitably 1.5 and preferably 0.8. The optimum molar ratio of C:A is about 0.5:1.

Component D is water and is suitably employed in a lower amount of about 0.1, preferably about 0.3 and more preferably about 0.4, mole of D per mole of A. The upper amount is suitably about 1.5, preferably about 1.1 and more preferably about 1.0, mole of D per mole of A. The optimum ratio of D:A is about 0.5 to 0.8:1.

The above components are employed such that when the molar ratio sum of (C+2D):A is greater than about 3:1, then the B:A molar ratio is at least about 1:1. Preferably the components are combined in the ratio where (B+C+2D):A is less than or equal to about 3:1 and more preferably less than about 2:1. In one embodiment, the following molar ratios are employed to form a catalyst which when contacted with a vicinal alkylene oxide produces a polyether of a very high intrinsic viscosity: B:A—about 0.25:1, C:A—about 0.5:1; and D:A—about 0.6:1. In a second embodiment, a catalyst is prepared which will give moderately high intrinsic viscosity polyethers when contacted with vicinal alkylene oxides according to the process described herein. The molar ratios in this second embodiment are: B:A—about 2.5:1; C:A—about 0.5:1; and D:A—about 0.5:1. The most preferred species of the catalyst are prepared in the form where B is phenothiazine or N-methylacetamide or C is 2,4-pentanedione.

The catalyst is suitably prepared by contacting the four components in the desired ratios in any of common hydrocarbon or chlorinated hydrocarbon diluents employed for organic reactions so long as they do not bear Zerewitinoff hydrogen atoms. Suitable diluents, for example, are hexane, toluene, benzene, styrene, decane, chlorobenzene, trichloroethane, perchloroethylene and the like. Other common solvents such as ethers like dioxane, THF, glycol diethers and the like are preferably avoided since they may tend to reduce the molecular weight of the polyethers prepared from such catalysts (perhaps due to presence of alcoholic impurities in such ethers).

The four components can be combined in any order desired, however, we have noted that it is preferable to combine Components B, C and D by mixing them well and thereafter adding Component A to the mixture of the other three components. In this fashion, a catalyst is produced which when contacted in the polymerization process with the vicinal alkylene oxides gives polyether products of the highest intrinsic viscosity. Combining Components A, B and C and thereafter adding Component D last gives a catalyst which produces polymers of the second highest intrinsic viscosity when utilized according to the invention process. It is also convenient to prepare the catalyst in situ in the monomer or monomers to be polymerized. Again, this is most preferably done by combining Components B, C and D in a solvent with the desired quantity of monomer and thereafter adding Component A to the mixture after which the polymerization is allowed to proceed. In this fashion, the alkylene oxide monomers act as cosolvents for the catalyst prior to initiation of the polymerization.

Polymerization Process

The invention process comprises contacting one or more vicinal alkylene oxides represented by the formula

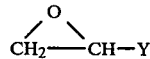

with a catalytically effective amount of the aforementioned catalyst. The vicinal alkylene oxide monomers are preferably those wherein $R_1$ represents H, chloromethyl, bromomethyl, or about a 1 to 6 carbon aliphatic hydrocarbyl group. Also preferred are vicinal alkylene oxides wherein $R_2$ represents the acyl residue of a carboxylic or fatty acid of about 1 to 18 carbon atoms, or a hydrocarbyl group of about 1 to 10 carbon atoms. Most preferably, the vicinal alkylene oxide is ethylene oxide, 1,2-propylene oxide, 1,2-butylene oxide, t-butyl glycidyl ether, 2-ethylhexyl glycidyl ether, allyl glycidyl ether, or phenyl glycidyl ether.

We have further noted that the invention catalyst seems to have no ability to polymerize other alkylene oxides which do not contain the above-described oxide moiety. For example, isobutylene oxide, styrene oxide, 2,3-epoxybutane, 1,4-dichloro-2,3-epoxybutane, cyclohexene oxide and 3,3-bis-bromomethyl oxetane, each in toluene, did not appear to be polymerized by the invention catalyst at temperatures of about 90°–110° C.

The vicinal alkylene oxide(s) of the invention process are suitably added to a solvent such as the ones mentioned above for preparation of the catalyst either before or after the preparation of the catalyst has been completed therein. The concentration of the monomer(s) will suitably be less than about 50 percent by weight of the solution and more preferably less than about 30 percent by weight since higher concentrations of the monomer result in such a thick, viscous solution upon polymerization that the products are difficult to process at higher concentrations.

Polymerization of the monomer(s) is initiated quite slowly at temperatures below about 25° C. Accordingly, the catalyst may be prepared in a solution of the monomer(s) at about that temperature or below. To initiate polymerization a temperature of approximately 50° C. to 200° C. is generally suitable with a range of about 80° C.–100° C. being preferred. Generally, higher temperatures will speed the conversion of monomer to polymer in the reaction process. The polymerization may be carried out at atmospheric or autogenous pressure of the system, however, a partial positive pressure in the reactor vessel is preferred to prevent the entry of air or moisture into the reaction medium which would serve to change the composition of or destroy the activity of the catalyst. Because of this sensitivity of the catalyst to moisture and oxygen, the polymerization reaction is preferably carried out in an inert atmosphere as is the preparation of the catalyst.

The catalyst and the monomer(s) may be contacted for any suitable time until the desired conversion of monomer(s) to polyether product is obtained at which time the polymerization may be terminated by the addition of an excess of water or other active hydrogen-containing compounds, such as alcohols or organic acids, to "kill" the catalytic activity. It has been found to be beneficial to "kill" the catalyst after the polymerization by addition of acetic acid or equivalent acid in slight excess, on a molar basis, to the amount of Al present in the catalyst. In this fashion, the color stability of the resultant polyether seems to be improved.

The resultant solution of the polyether product may then be additionally washed with portions of water, slightly acidified, to remove the residual catalyst in the reaction mixture. These water washings are then decanted from the solution of the polymer and the solution of the polymer utilized at suitable concentrations for the purpose of thickening or the polymer may be recovered by evaporation of the solvent followed by suitable processing of the polymer, if desired. Where the polymer is to be prepared in a reactive solvent such as styrene, separation may be unnecessary since the styrene is thereafter or concurrently polymerized incorporating the polyether in the resulting mass.

The concentration of the catalyst in the polymerization process is suitably any small catalytically effective amount up to about 10 mole percent of Component A based on the monomer(s). About 0.1 to about 5 mole percent is suitable and catalyst in excess of 6 percent is usually wasted. Preferably about 2 to 5 mole percent catalyst is employed.

The process may be carried out in suitable reactors for the polymerization of alkylene oxides which are well-known in the art. It may be carried out, most commonly as a batch in a kettle, or as a continuous process in an apparatus such as the "Sowbelly" reactor.

Intrinsic Viscosity Determination

Conventional approaches to molecular weight measure of the polyethers prepared herein are often not appropriate. This is usually due to plugging effects because of the propensity of high molecular weight polyethers to "thicken with shear". It is especially troublesome with such techniques as gel permeation chromatography for molecular weight estimation. Nonetheless, dissolved concentrations of less than about 0.06 weight percent of the polyethers generally do not undergo the shear thickening phenomenon. In view of the difficulties in employing gel permeation chromatography to compare the relative molecular weights of polyethers produced herein, the alternate method of comparing intrinsic viscosities was instead employed.

Intrinsic viscosity [η] is related to molecular weight by the equation:

$$[\eta] = MK^\alpha$$

wherein K is a constant, M is molecular weight and α is another constant (correlated to the degree of configurational coiling in the architecture of an involved polymer).

The value of [η] is determined by plotting the measured specific viscosity divided by concentration of polymer in solution ($\eta_{sp}$/conc.) vs. conc. and extrapolating to zero concentration. It is dependent upon the solvent and temperature used during measurements. Toluene (TO) is a good solvent for the purpose. And, 100° F. (38° C.) is an apt temperature at which to measure $\eta_{sp}$, per the equation:

$$\eta_{sp} = \frac{t - t_o}{t_o},$$

wherein t is the efflux time of solution and $t_o$ is the efflux time of solvent.

Efflux times are readily measurable in an Ostwald viscometer taking values of solutions at four different concentrations. Usually 1-2 g of the polymer solution (≃30 percent solids) is dissolved in TO overnight with stirring. It is then volumetrically diluted to ≃100 ml. Aliquots of 2 ml, 5 ml, and 15 ml from this stock solution are then further diluted to: 10 ml, 10 ml, and 25 ml, respectively, with more TO. Efflux times are then measured on the stock solution, each of the three solutions and on TO. With the viscometer employed, TO had a $t_o$ of 30.6 seconds, while t for the most concentrated solution being tested is best kept below 200 seconds by adjusting concentration.

Concentration for each diluted solution is simply calculable from the concentration of the stock solution. Three samples of this stock solution are then ordinarily weighed into aluminum dishes from which they are devolatilized in a vacuum oven at 100° C. overnight (under a normal line vacuum). The aluminum dishes are then reweighed to determine the weight of pure polymer remaining. Concentration is then calculated as weight percent. This method of determining concentration is quite convenient since concentration normally associated with measuring [η] is reported in the literature as "grams/deciliter". Therefore, values for concentration so determined are higher by a factor corresponding to the density of TO (0.8502 g/cc at 38° C.). Values for $\eta_{sp}$/conc. and [η] are correspondingly, therefore, lower by this factor also. Consistent with this, the herein given [η] values are corrected for the density factor, with [η] being herein reported in units of dl/g.

In some experimental work there was polystyrene present in the polyether during the specific viscosity determination. In such cases, the respective [η] was corrected by using the following relation:

$$[\eta]_{mixt} = [\eta]_{PS} W_{PS} + [\eta]_{PE} W_{PE}$$

where

[η]$_{mixt}$=intrinsic viscosity of the mixture in dl/g;
[η]$_{PS}$=intrinsic viscosity of the polystyrene (usually 0.77 dl/g);
[η]$_{PE}$=intrinsic viscosity of the polyether, dl/g; and
$W_{PS}$, $W_{PE}$=weight factors of polystyrene and polyether, respectively.

This relation was verified experimentally with mixtures of pure polystyrene and pure polyether.

In the following embodiments and elsewhere in this specification, intrinsic viscosity [η] reported is determined as described above from measurements of specific viscosity of dilute solutions of the polyether in toluene at about 100° F. (38° C.), unless otherwise specified.

SPECIFIC EMBODIMENTS OF THE INVENTION

Unless otherwise specified, the invention catalyst described in the following embodiments is prepared by contacting phenothiazine, 2,4-pentanedione, water and triethylaluminum in the molar ratio of about 0.25:0.5:5:1. The phenothiazine, 2,4-pentanedione and water are first mixed into a solution of the vicinal alkylene oxide to be polymerized and the triethylaluminum is then added to this mix at about or below room temperature.

EXAMPLE 1

A variety of catalysts are prepared in the fashion described above, but with various secondary amines substituted for phenothiazine. The resulting catalysts are then employed to polymerize t-butyl glycidyl ether in diethylbenzene (about 35 weight percent monomer solution) at about 85° C. for about 44 hours. The amount of catalyst employed is about 2.25 mole percent, based on monomer. Typical intrinsic viscosities for the resultant polyethers produced from such polymerizations are listed in Table I, below, with the amines listed in order of decreasing basicity.

TABLE I

| | Various Amines | |
|---|---|---|
| Amine | [η] in dl/g | Comments |
| Morpholine | — | Thick liquid* |
| Diphenylamine | 17.2 | |
| Phenothiazine | 22.7 | |
| Phenoxazine | 41.3 | |
| 3,7-Dinitrophenothiazine | — | Thick liquid* (Insoluble catalyst) |

*"Thick liquid" indicates [η] of about 1 dl/g or less.

Other tests substituting N-methylacetamide for phenothiazine in the catalyst indicate that a resulting polymer produced from t-butyl glydicyl ether exhibits intrinsic viscosity about 40 percent or more greater than a polymer produced using the corresponding phenothiazine-derived catalyst.

EXAMPLE 2

In a stirred reactor, 85:15 (mole ratio) mixtures of propylene oxide and allyl glycidyl ether, respectively, are polymerized in styrene, ethylbenzene and mineral oil. Various catalysts, prepared as previously described, are employed for these polymerizations with the secondary amine employed in the catalyst being varied. Once all the components have been charged to the reactor, liberated ethane from in situ catalyst preparation is vented and the reactor is heated up to about 110° C. over a 55-minute time period with continuous agitation of the reaction mixture. At a temperature of about 90° C., samples are removed and determination of intrinsic viscosity is carried out. Representative intrinsic viscosities for polymers prepared in this fashion (with suitable correction for solvent and styrene as previously described) are set forth below in Table II.

TABLE II

Various Amines

| Amine | $[\eta]$ in dl/g |
|---|---|
| Diethylamine | 1.4 |
| N—Methylaniline | 3.1 |
| [None] | 4.4 |
| Diphenylamine | 7.2 |
| Phenothiazine | 8.2 |
| Phenoxazine | 7.4 |

The reaction mixtures are further heated to fully polymerize the styrene and yield modified polystyrenes having good physical properties.

EXAMPLE 3

The effect of the secondary amine to alkyl aluminum mole ratio in a catalyst of the invention on intrinsic viscosities of polyethers prepared with such a catalyst is demonstrated. In the fashion of Example 1, various catalysts are prepared using phenothiazine but varying the phenothiazine:triethylaluminum mole ratio. Representative intrinsic viscosities for polymers prepared from t-butyl glycidyl ether, are listed in Table III, below. The effect that this ratio has on intrinsic viscosity of polyethers prepared from the invention catalyst is graphically depicted in FIG. 1.

TABLE III

Effect of Secondary Amine:Alkyl Aluminum Ratio

| Mole Ratio* | $[\eta]$ in dl/g |
|---|---|
| 0.03 | 11.4 |
| 0.07 | 14.6 |
| 0.13 | 15.7 |
| 0.25 | 19.3 |
| 0.50 | 15.3 |
| 1.0 | 9.8 |
| 1.5 | 8.6 |
| 2.5 | 6.2 |

*Moles of phenothiazine per mole of triethylaluminum.

EXAMPLE 4

The effect of the water to alkyl aluminum mole ratio in a catalyst of the invention on intrinsic viscosities of polyethers prepared with such a catalyst is demonstrated. In the fashion of Example 1, various catalysts are prepared, varying the amount of water. The catalysts are employed in about 4.6 mole percent (based on moles of propylene oxide) to polymerize 95:5 (mole ratio) mixtures of propylene oxide and allyl glycidyl ether, respectively. Employed are about 7.4 weight percent solutions of the monomer mixture in ethylbenzene. Polymerizations are carried out at about 50° C. for the same time period. Representative intrinsic viscosities of polyethers prepared in this fashion are listed in Table IV, below. These values are depicted graphically in FIG. 2.

TABLE IV

Effect of Water:Alkyl Aluminum Ratio

| Mole Ratio* | $[\eta]$ in dl/g |
|---|---|
| 0.25 | 8.3 |
| 0.38 | 9.9 |
| 0.50 | 8.2 |
| 0.62 | 13.3 |
| 0.75 | 13.1 |
| 1.0 | 7.4 |
| 1.25 | 3.5 |

*Moles of water per mole of triethylaluminum.

Figure 2:
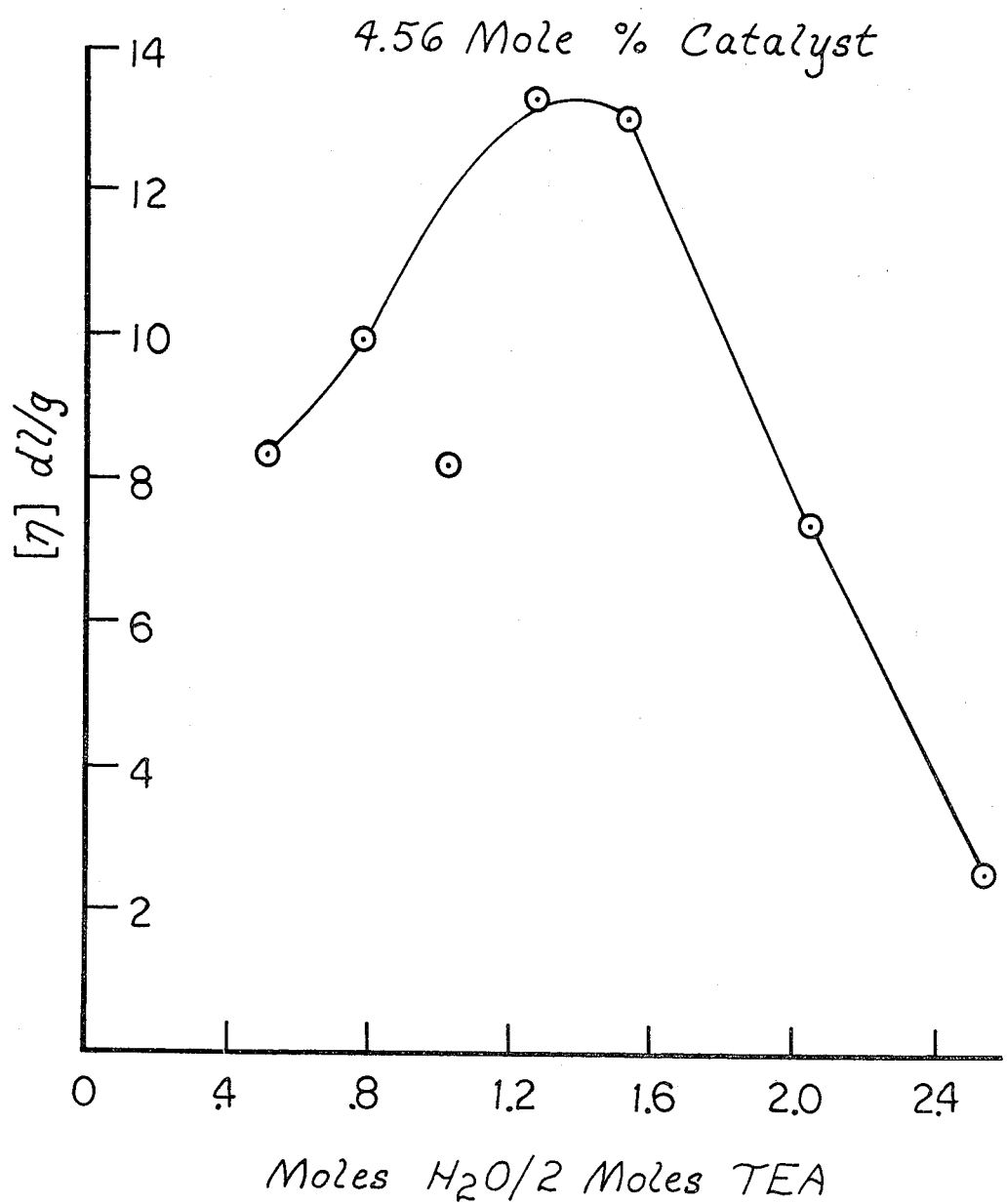

Samples taken at intervals as the polymerizations progress indicate that the rate of conversion to polyether is affected in a fashion parallel to that demonstrated for intrinsic viscosity in FIG. 2 when plotted for the same water:triethylaluminum mole ratio variations.

EXAMPLE 5

As previously noted, the order in which the catalyst components are combined has a significant effect on the activity of the resulting catalyst in the polymerization of vicinal alkylene oxides. It can affect significantly the conversion rate of such a polymerization and to a lesser degree the intrinsic viscosity of the resultant polyethers.

This is demonstrated by preparing catalysts by three different orders of addition of the components to a 35 weight percent solution of propylene oxide in toluene and polymerizing at 90° C. using about 2.25 mole percent of each catalyst. The three orders are depicted below schematically. "PO" represents propylene oxide, "TO" represents toluene, "H₂O" represents water, "TEA" represents triethylaluminum, "PD" represents 2,4-pentanedione and "PT" represents phenothiazine. Samples are withdrawn at timed intervals during the course of polymerization and determination made of intrinsic viscosity and degree of conversion of the PO.

Method No. 1—(TEA+PT+TO) is added to the mixture of (H₂O+PD+PO).

Method No. 2—TEA is added to a mixture of all the other components.

Method No. 3—TEA is added to the mixture of (PD+PT+TO) and then H₂O is added last.

Representative conversion and intrinsic viscosity values for the three different methods are described below in Table V.

TABLE V

Effect on Conversion and $[\eta]$ of Catalyst Components' Addition Order

| Method of Preparation | Time After Polymerization Begun (min) | $[\eta]^*$ in dl/g | Percent of Theoretical Conversion to Polymer |
|---|---|---|---|
| 1 | 5 | — | 14.7 |
| 1 | 17 | 6.7 | 20.1 |
| 1 | 30 | — | 25.1 |
| 1 | 45 | — | 28.4 |
| 1 | 60 | 5.8 | 30.8 |
| 1 | 75 | — | 34.3 |
| 1 | 105 | — | 38.3 |
| 1 | 135 | — | 42.5 |
| 1 | 165 | 6.1 | 46.2 |
| 2 | 7 | 6.2 | 24.6 |
| 2 | 10 | — | 28.1 |
| 2 | 15 | — | 35.9 |
| 2 | 20 | — | 42.2 |
| 2 | 30 | 6.7 | 49.0 |
| 2 | 40 | — | 56.1 |
| 2 | 60 | — | 67.5 |
| 2 | 90 | — | 77.2 |
| 2 | 120 | 8.8 | 88.3 |
| 3 | 5 | 7.2 | 16.0 |

TABLE V-continued
Effect on Conversion and [η] of Catalyst Components' Addition Order

| Method of Preparation | Time After Polymerization Begun (min) | [η]* in dl/g | Percent of Theoretical Conversion to Polymer |
|---|---|---|---|
| 3 | 10 | — | 22.8 |
| 3 | 15 | — | 28.8 |
| 3 | 20 | — | 31.9 |
| 3 | 30 | 7.8 | 37.6 |
| 3 | 40 | — | 42.5 |
| 3 | 60 | — | 53.3 |
| 3 | 97 | — | 63.0 |
| 3 | 120 | 7.7 | 68.1 |

*Error ±5%.

From the foregoing, one can observe that catalyst prepared by Method No. 2 is superior to that prepared by the other methods in respect to its utility in obtaining rapid conversion of vicinal alkylene oxides to high molecular weight polyethers.

We claim:

1. A process for the polymerization of a vicinal alkylene oxide represented by the formula

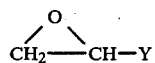

where Y represents $R_1$ or $CH_2OR_2$; $R_1$ represents H, an aliphatic hydrocarbyl group of about 1 to 20 carbon atoms, a chloromethyl or a bromomethyl group; and $R_2$ represents the acyl residue of a carboxylic or fatty acid of about 1 to 30 carbon atoms or a hydrocarbyl group of about 1 to 20 carbon atoms which may bear other vicinal alkylene oxide groups or inert substituents; said process comprising contacting said vicinal alkylene oxide with a catalytically effective amount of a catalyst comprising a composition prepared by contacting:

Component A, a compound represented by the formula RR'AlX wherein R and R' each independently represent an alkyl group of 1 to 4 carbon atoms, and X represents hydrogen or an alkyl or alkoxy group of 1 to 4 carbon atoms;

Component B, an organic nitrogen base compound selected from secondary nitrogen-containing compounds having basicity about equal to or less than the basicity of dimethylamine and having no active hydrogen atoms other than those of the secondary nitrogen;

Component C, a beta-diketone; and

Component D, water;

in the molar ratios of

B:A—about 0.01 to 2.5:1

C:A—about 0.1 to 1.5:1

D:A—about 0.1 to 1.5:1 provided that when the molar ratio of (C+2D):A is greater than about 3:1 then the B:A molar ratio is at least about 1:1.

2. A process of claim 1 wherein

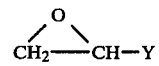

represents ethylene oxide, 1,2-propylene oxide, 1,2-butylene oxide, epichlorohydrin, allyl glycidyl ether, t-butyl glycidyl ether, 2-ethylhexyl glycidyl ether or n-butyl glycidyl ether.

3. A process of claim 1 wherein the molar ratios in said catalyst are

B:A—about 0.1 to 0.5:1;

C:A—about 0.2 to 0.8:1; and

D:A—about 0.3 to 1.1:1.

4. A process of claim 1 wherein Component A is triethylaluminum, Component B is phenothiazine and Component C is 2,4-pentanedione.

5. A process of claim 4 wherein the molar ratios in said catalyst are:

B:A—about 0.25:1;

C:A—about 0.5:1; and

D:A—about 0.6:1.

6. A process of claim 1, 3, 4 or 5 wherein said catalyst is prepared by adding Components B, C and D to a solution comprising said vicinal alkylene oxide and Component A is thereafter added to said solution.

7. A process of claim 1 wherein said vicinal alkylene oxide comprises 1,2-propylene oxide.

8. A process of claim 7 wherein said vicinal alkylene oxide further comprises allyl glycidyl ether or epichlorohydrin.

* * * * *